(12) United States Patent
Gao et al.

(10) Patent No.: US 12,434,968 B2
(45) Date of Patent: Oct. 7, 2025

(54) AIR FILTER ASSEMBLY

(71) Applicant: PTI Technologies, Inc., Oxnard, CA (US)

(72) Inventors: Michael L. Gao, Oxnard, CA (US); Kanwar Suri, Porter Ranch, CA (US)

(73) Assignee: PTI Technologies, Inc., Oxnard, CA (US)

( * ) Notice: Subject to any disclaimer, the term of this patent is extended or adjusted under 35 U.S.C. 154(b) by 726 days.

(21) Appl. No.: 17/856,907

(22) Filed: Jul. 1, 2022

(65) Prior Publication Data

US 2022/0332577 A1 Oct. 20, 2022

Related U.S. Application Data

(63) Continuation-in-part of application No. 16/601,087, filed on Oct. 14, 2019, now Pat. No. 11,377,350, (Continued)

(51) Int. Cl.
*A62B 7/08* (2006.01)
*B01D 50/00* (2022.01)
(Continued)

(52) U.S. Cl.
CPC ............. *C01B 13/10* (2013.01); *B01D 53/75* (2013.01); *B01D 53/8675* (2013.01); *B01D 53/885* (2013.01); *B64D 13/06* (2013.01); *B01D 2257/106* (2013.01); *B01D 2258/06* (2013.01); *B64D 2013/0651* (2013.01); *B64D 2013/0685* (2013.01); *C01B 2201/62* (2013.01)

(58) Field of Classification Search
CPC .... B01D 46/0023; B01D 47/06; B01D 53/76; B01D 53/007; B01D 39/2068; B01D 46/00; B65D 90/22
USPC ........ 422/5, 120, 168, 305–306; 96/15, 108; 454/228; 95/90, 273; 220/88.3; 55/486, 55/523
See application file for complete search history.

(56) References Cited

U.S. PATENT DOCUMENTS 8,273,162 B2 * 9/2012 Pagano ............. B01D 53/0407
96/108
10,160,647 B2 12/2018 Gao et al.
(Continued)

Primary Examiner — Monzer R Chorbaji
(74) Attorney, Agent, or Firm — Harness, Dickey & Pierce, P.L.C.; Anthony G. Fussner

(57) ABSTRACT

A compact lightweight air filtration system is disclosed. The air filtration system includes a hydrophobic particulate/coalescing filter and a cleanable ozone converter housed in a housing with an inlet and an outlet. Air flowing from the inlet to the outlet passes through the particulate/coalescing filter element and then the cleanable ozone converter to remove particulates, aerosols, liquids, and ozone. The air filtration system may comprise a fuel tank inerting system (FTIS) filter assembly. The FTIS filter assembly may include a binderless media (no binder) suitable for use in high temperatures. The FTIS filter assembly includes a catalytic converter configured to adsorb one or more VOCs, such as Toluene, Propylene Glycol ($C_3H_8O_2$), Pentanoic Acid, Butane ($C_4H_{10}$), Formaldehyde ($CH_2O$), and Carbon Dioxide ($CO_2$).

20 Claims, 9 Drawing Sheets

Related U.S. Application Data which is a continuation-in-part of application No. 16/230,418, filed on Dec. 21, 2018, now Pat. No. 10,442,690, which is a continuation of application No. 15/222,512, filed on Jul. 28, 2016, now Pat. No. 10,160,647.

(60) Provisional application No. 62/313,898, filed on Mar. 28, 2016.

(51) Int. Cl.
*B01D 53/02* (2006.01)
*B01D 53/75* (2006.01)
*B01D 53/86* (2006.01)
*B01D 53/88* (2006.01)
*B03C 3/00* (2006.01)
*B64D 13/06* (2006.01)
*B65D 90/22* (2006.01)
*C01B 13/10* (2006.01)

(56) References Cited

U.S. PATENT DOCUMENTS

| | | | |
|---|---|---|---|
| 10,442,690 B2 | 10/2019 | Gao et al. | |
| 11,377,350 B2 | 7/2022 | Gao et al. | |
| 2005/0045039 A1* | 3/2005 | Shellhammer | B01D 53/02 96/108 |
| 2008/0087168 A1 | 4/2008 | Wright | |
| 2008/0170971 A1* | 7/2008 | Bergeron | A61L 9/22 422/186.04 |
| 2009/0166358 A1* | 7/2009 | Bose | B01D 53/24 220/88.3 |
| 2010/0101413 A1* | 4/2010 | Jones | B01J 20/024 96/108 |

* cited by examiner

AIR FILTER ASSEMBLY

CROSS-REFERENCE TO RELATED APPLICATIONS

This application is a continuation-in-part of U.S. patent application Ser. No. 16/601,087 filed Oct. 14, 2019, which published as US2020/0039823 on Feb. 6, 2020 and issues as U.S. Pat. No. 11,377,350 on Jul. 5, 2022.

U.S. patent application Ser. No. 16/601,087 is a continuation-in-part of U.S. patent application Ser. No. 16/230,418 filed Dec. 21, 2018, which published as US2019/0135631 on May 9, 2019 and issued as U.S. Pat. No. 10,442,690 on Oct. 15, 2019.

U.S. patent application Ser. No. 16/230,418 is a continuation of U.S. patent application Ser. No. 15/222,512 filed Jul. 28, 2016, which published as US2017/0275164 on Sep. 28, 2017 and issued as U.S. Pat. No. 10,160,647 on Dec. 25, 2018.

U.S. patent application Ser. No. 15/222,512 claims the benefit of and priority to U.S. Provisional Patent Application Ser. No. 62/313,898 filed Mar. 28, 2016.

The entire disclosures of the above patent applications are incorporated herein by reference.

FIELD

Embodiments of the present disclosure relate to air filtration and more particularly to air filtration with integrated particulate filtering, coalescing, and cleanable/reusable ozone conversion properties.

BACKGROUND

This section provides background information related to the present disclosure which is not necessarily prior art.

Aircraft cabins may contain hundreds of passengers crowded into a small space for an extended period of time. The air within the aircraft cabin may be polluted to various degrees by dust, pollens, lint, and smoke. The air is often recycled, such that a portion of the air is returned to the cabin and mixed with fresh air.

To reduce the amount of pollutants, the cabin air is recirculated through filters to reduce the amount of pollutants. Additionally, fresh air is provided from an external source to supplement the recirculated air. Commercial aircraft cabins and flight decks typically recirculate approximately 50% of the cabin air and add approximately 50% fresh air from the external source. The external source of air assures that the recirculated portion does not endlessly recirculate but is diluted and replaced with outside air.

In addition to pollutants, there are other treatments that may be applied to the air. For instance, oil mist may be present in the recirculated air or the fresh air, which should be removed before supplying the air to the cabin. Furthermore, ozone may be present at elevated concentrations in the atmosphere. Supplying the cabin with air high in ozone content may irritate the passengers breathing or cause other health risks.

Ideally, cabin air should be substantially free of particulate, oil mist, and ozone for the benefit of cabin passengers. To this end, airlines are currently equipped with filtrations systems and coalescing filters for removing oil mist. Additionally, newer airlines may include ozone removal systems to lower the ozone levels in the cabin.

In addition to cabin air, there are other systems in an aircraft that require filtered air low levels of ozone. For example, the fuel tanks of modern aircraft include fuel inerting systems for reducing the risk associated with an explosion of the fuel in the tank. These systems may work by replacing spent fuel with an inert gas such as nitrogen. While nitrogen is readily available from the ambient atmosphere, it is mixed with oxygen that must be removed to obtain an inert gas. This may be done through the use of an air separation module, as commonly known to one of skill in the art. The air separation module requires a source of filtered air substantially free of particulates, oil, liquids, and ozone to extend the efficiency and life of the module.

While each of the described systems are generally effective for their intended purposes, extra space and weight add to fuel costs and reduce the amount of fare paying cargo that an airline may transport. Therefore, each system may not be the optimal size, or other compromises may be made to reduce the weight or size.

It would be beneficial to treat cabin air in a manner that was at least as effective as the described systems, while minimizing the cost, size, and weight of the systems required to treat the cabin air.

SUMMARY

This section provides a general summary of the disclosure and is not a comprehensive disclosure of its full scope or all of its features.

In one aspect a fuel tank inerting system (FTIS) filter assembly is disclosed. The FTIS filter assembly includes a binderless media (no binder) suitable for use in high temperatures. The FTIS filter assembly includes a catalytic converter configured to adsorb one or more VOCs, such as Toluene, Propylene Glycol ($C_3H_8O_2$), Pentanoic Acid, Butane ($C_4H_{10}$), Formaldehyde ($CH_2O$), and Carbon Dioxide ($CO_2$).

In one aspect a filter assembly is disclosed. The filter assembly includes a housing, a particulate/coalescing element, and a cleanable ozone converter. The particulate/coalescing is disposed in the housing and includes a hydrophobic filtration media. The ozone cleanable converter is disposed in the housing and includes a passageway having a catalytic interface surface. The filter assembly has a flow path through the housing that includes flowing through the particulate/coalescing element and then through the cleanable ozone converter before exiting the housing.

In some embodiments, the housing includes a manifold having an inlet and an outlet, and a filter bowl removably coupled to the manifold. In some embodiments the housing is cylindrical. In some embodiments, the flow path flows from the manifold inlet into the particulate/coalescing element and from the cleanable ozone converter into the manifold outlet.

In some embodiments, the filter assembly further includes a drain plug in a bottom of the manifold. In some embodiments, the manifold has an inner flange sized to receive the cleanable ozone converter and an outer flange sized to receive the filter element. In some embodiments, the manifold outlet extends to a central location of the manifold. In some embodiments, a V-band secures the filter bowl to the manifold.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding (though not necessarily identical) parts throughout the several views of the drawings.

DETAILED DESCRIPTION

Example embodiments will now be described more fully with reference to the accompanying drawings.

Figure 1:
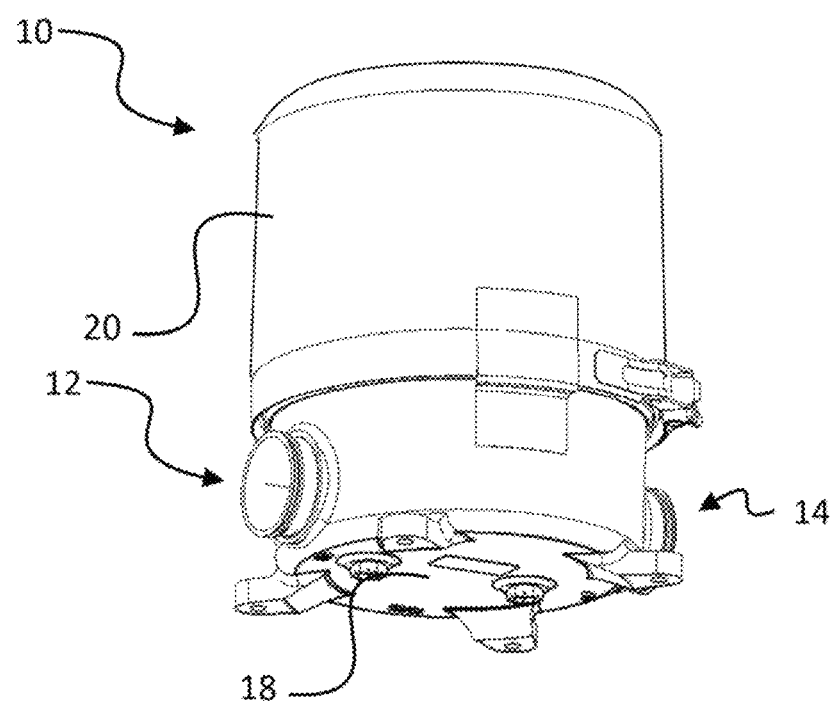
FIG. 1 illustrates an embodiment of an air filtration system.

FIG. 1 illustrates an external view of an air filtration system 10. The air filtration includes an inlet 12 for receiving a supply of untreated air, and an outlet 14 for delivering treated air. Between the inlet 12 and the outlet 14, the air filtration system 10 has three stages for treating a flow of air between the inlet 12 and the outlet 14. The first stage removes liquids from the air, the second stage removes particulates and aerosols, and the third stage removes ozone from the filtered air. The air filtration system 10 includes a housing comprising a manifold 18 having the inlet 12 and outlet 14, and a filter bowl 20 for covering the internal components.

Figure 2:
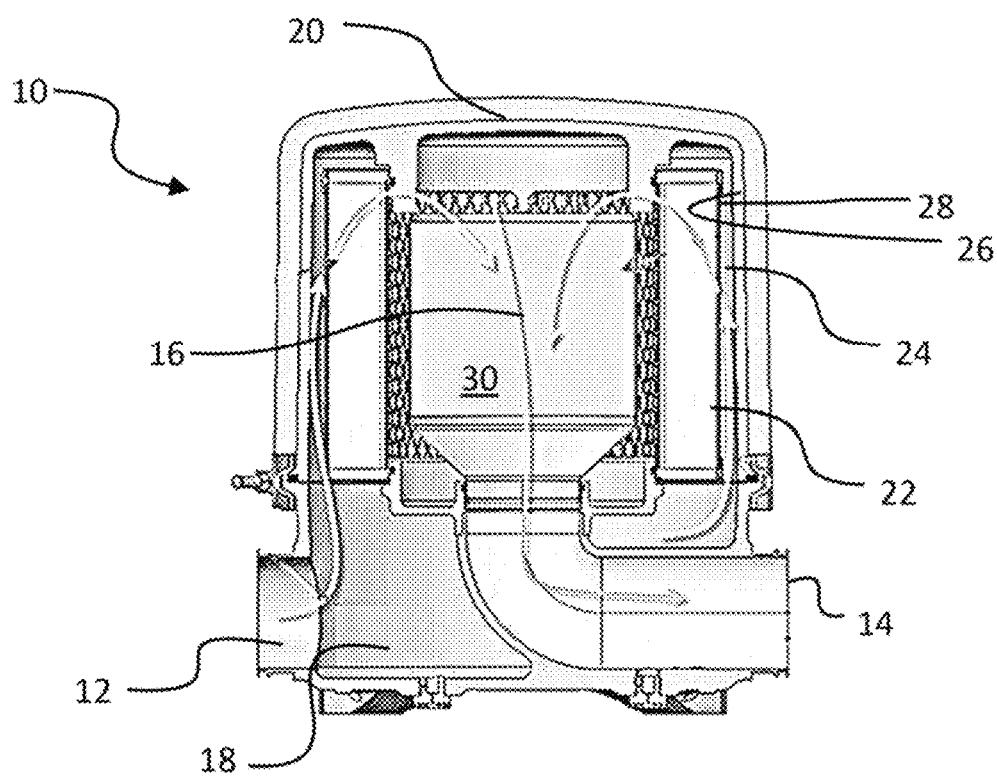
FIG. 2 illustrates a cross section of the embodiment of FIG. 1.

FIG. 2 illustrates a cross section of the air filtration system 10 of FIG. 1. Arrows 16 signify a path for the flow of air from the inlet 12 to the outlet 14. In operation, the air first flows into the manifold 18 where it is directed into the filter bowl 20. Within the filter bowl 20 is a filter element 22 and an annular space 24 which is defined by an interior surface 26 of the filter bowl 20 and an exterior surface 28 of the filter element 22. The air flows from the manifold 18 and into the annular space 24, enveloping the filter element 22.

From the annular space 24, the air flows through the filter element 22, where stage 1 and stage 2 of the filtration process removes liquids, particulates, and aerosols. From the filter element 22, the air passes through a cleanable ozone converter 30 and back into the manifold 18, where it is directed out through the outlet 14.

Figure 3:
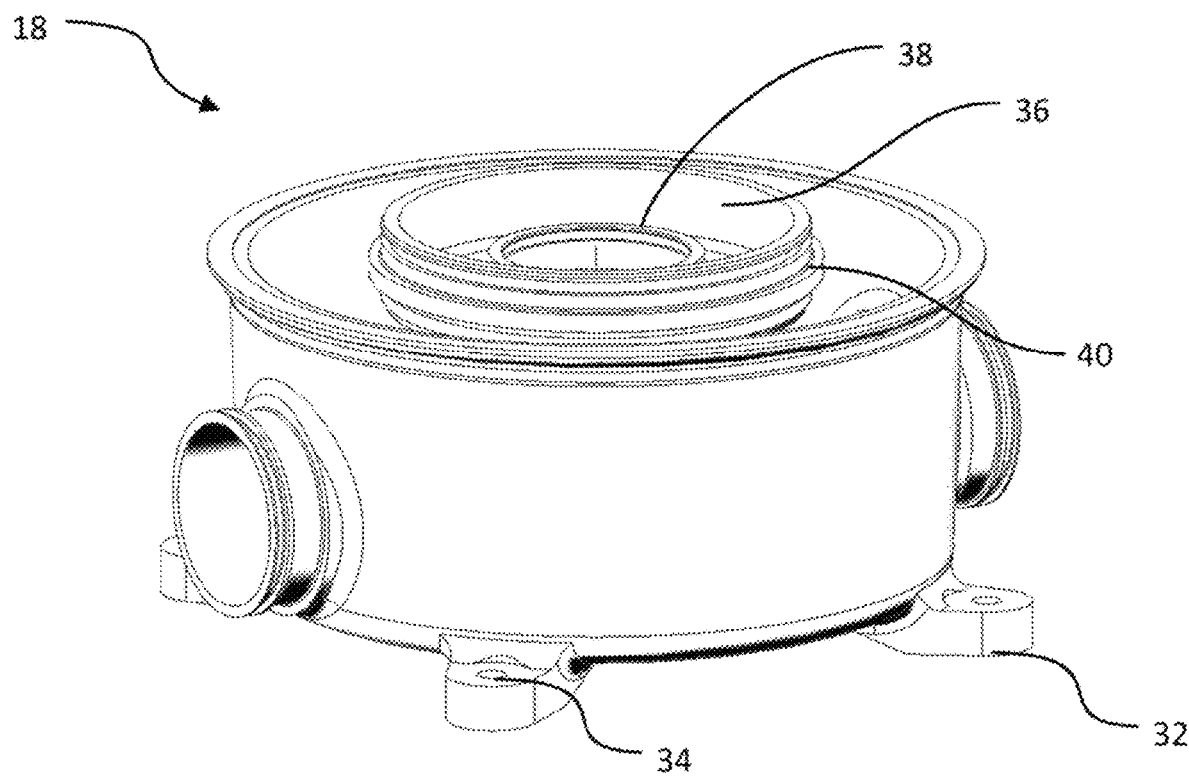
FIG. 3 illustrates a manifold for the air filtrations system of FIG. 1.

FIG. 3 illustrates the manifold 18 of FIG. 2, separate from the other components of the air filtration system 10. The manifold 18 has protrusions 32 at a base end having through holes 34 for mounting the manifold 18. The manifold 18 is circular in shape and has a centrally located ring 36 configured to receive the cleanable ozone converter 30 and the filter element 22. The centrally located ring 36 has an inner flange 38 configured to receive a base of the cleanable ozone converter 30, and an outer flange 40 configured to receive a base of the filtering element 22.

Figures 4, 5:
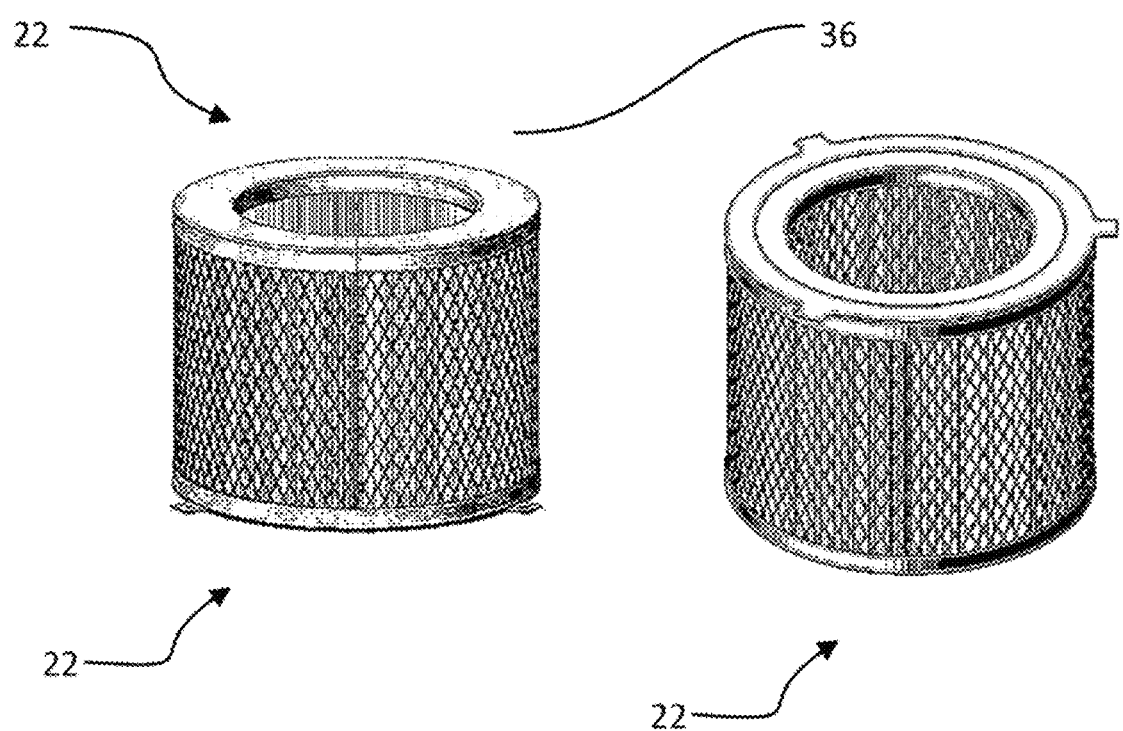
FIG. 4 illustrates a top view of a filter element for the air filtrations system of FIG. 1.
FIG. 5 illustrates a bottom view of the filter element for the air filtration system of FIG. 1.

FIG. 4 illustrates a top end of the filter element 22 separate from the remaining components of the air filtration system 10. FIG. 5 illustrates a bottom end of the filter element 22 separate from the remaining components of the air filtration system 10. The filter element 22 comprised of a porous, multilayer sheet of material that is folded into pleats and formed in a cylinder. The top of the cylinder is sized to fit in a protrusion of the filter bowl, while the base is sized to engage the outer flange 40 of the manifold 18. Thus, when assembled, the filter element 22 is held in place at the top end by the protrusion and at the bottom end by the outer flange 40. Air is only able to pass from the annular space 24 into the outlet of the manifold 18 by passing through the filter element 22.

In some embodiments, the base of the filter element 22 and/or the top of the filter element 22 may be formed of an elastic material suitable for forming a seal between the outer flange 40 and the protrusion of the filter bowl. In some embodiments, a gasket may be used between sealing surfaces of the filter bowl and the filter element 22 and/or the manifold 18 and the filter element 22.

Figure 6:
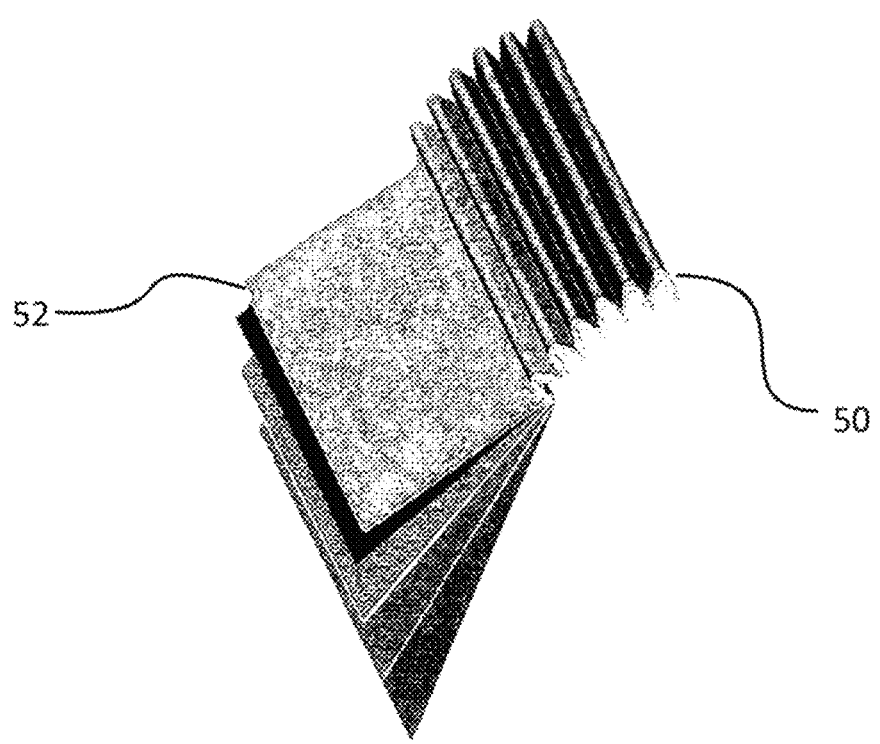
FIG. 6 illustrates a media pack layout of the filter element.

FIG. 6 illustrates the filter element 22 showing pleats 50 and multiple layers 52 and stages of filtration. The filter element 22 uses conventional filtration techniques to filter particulates in the air passing through the filter element 22 including impingement, interception, diffusion, and straining. The filter element 22 may be comprised of fiber having a size and spacing selected for the desired level of filtering.

In addition to the conventional filtering of particulates and aerosols, the layers of the filter element 22 are hydrophobic, either by way of a coating or the fibers themselves being hydrophobic. The filter element 22 filters water droplets in the air passing through the filter in a conventional manner like it does for particulates and aerosols. However, because the fibers are hydrophobic, the water droplets captured on the fibers are unable to wet the surface. The water droplets then combine to form water droplets of increasing size, eventually dropping from the filter element 22 and into the manifold 18.

Figure 7:
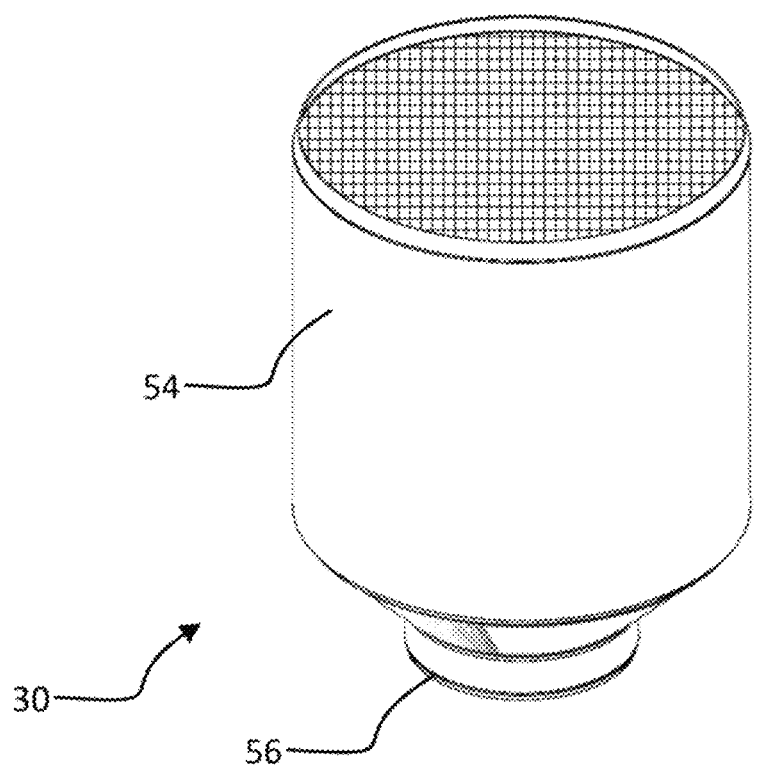
FIG. 7 illustrates a cleanable ozone converter for the air filtration system of FIG. 1.

FIG. 7 illustrates the cleanable ozone converter 30 separate from the remaining elements. The cleanable ozone converter 30 has passageways passing through the cleanable ozone converter 30 from an outer surface 54 to a converter outlet 56, such that air flows through the cleanable ozone converter 30 to reach the converter outlet 56. The passageways may be formed by an open cell structure, a porous structure of the cleanable ozone converter, rows of material having gaps there between, pellets having interstitial spaces between adjacent pellets, or other techniques as known to one of skill in the art. The passageways increase the surface area of the cleanable ozone converter 30 that interact with the air flowing through the cleanable ozone converter 30.

The cleanable ozone converter 30 contains a catalyst material such as platinum, platinum alloy, or other catalyst materials as known in the art. The catalyst material increases the rate at which ozone contained in the air flow decomposes and reacts with atmospheric oxygen. The passageways in the cleanable ozone converter 30 may be coated with the catalyst material rather than having a solid catalyst construction. For example, in one embodiment a corrosion resistant foil substrate coated with a slurry of platinum and iridium is used to form a honeycomb of passageways through the cleanable ozone converter 30. Such materials are compatible to most known contaminants in a climate controlled operating environment.

Figure 8:
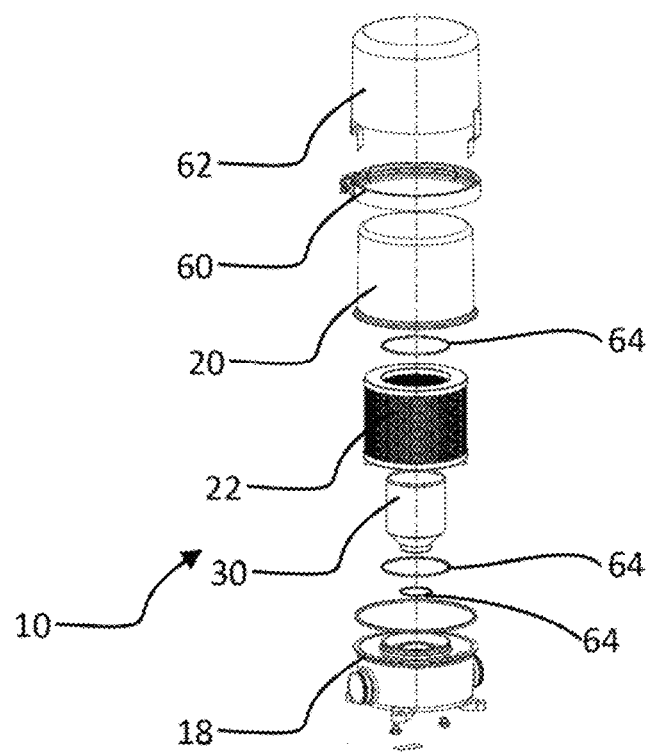
FIG. 8 illustrates an exploded view of the air filtration system of FIG. 1.

FIG. 8 illustrates the air filtration system 10 of FIG. 1 in an exploded view, showing the general assembly of the air filtration system 10. The manifold 18 is generally mounted to a secure surface using the protrusions 32, 34 at the base of the manifold. The filter bowl 20 is removable to allow access to the interior of the air filtration system 10. A V-band 60, or ring clamp secures the filter bowl 20 to the manifold 18 in a removable fashion. A removable insulation layer 62 may be placed over the filter bowl 20 for insulation. The insulation layer 62 has hook and loop fasteners for temporary attachment to the manifold 18 or bowl 20, allowing the insulation layer 62 to be easily removed for service. Other fasteners are possible such as snaps, button, zippers, and other means of temporary attachment.

The cleanable ozone converter 30 is housed on the inner flange of the manifold 18 with the filter element 22 surrounding the cleanable ozone converter 30; the filter element 22 being housed on the outer flange. Gaskets 64 may be placed between the filter bowl 20 and the manifold 18, the cleanable ozone converter 30 and the manifold 18, the filter bowl 20 and the filter element 22, and the manifold 18 and the filter element 22.

In use, liquid captured by the coalescing filter element 22 falls into the manifold 18 when the droplets grow to suitable size. Drain plugs in the bottom of the manifold 18 allow the liquid to drain out the bottom of the manifold 18. The drain plugs may be pressure sensitive, such that they only drain when a set inlet pressure is exceeded. For example, the drain plugs might be closed when the filtration system is not in use, but when air is directed to the inlet, the increase in pressure may cause the drain valves to open, draining any liquid in the manifold.

Figure 9:
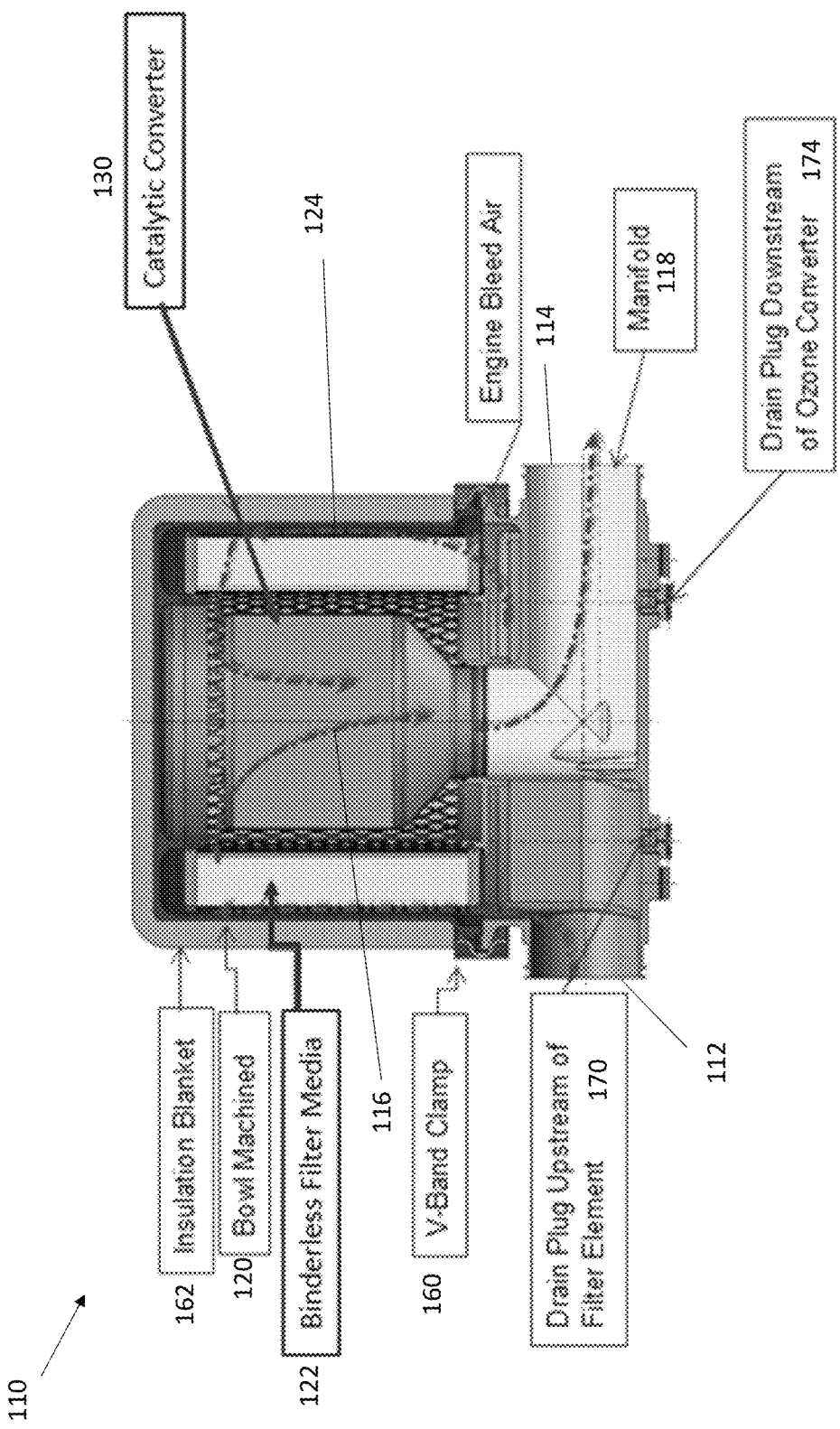
FIG. 9 illustrates a cross section of an embodiment of a fuel tank inerting system (FTIS) filter assembly.
Figure 10:
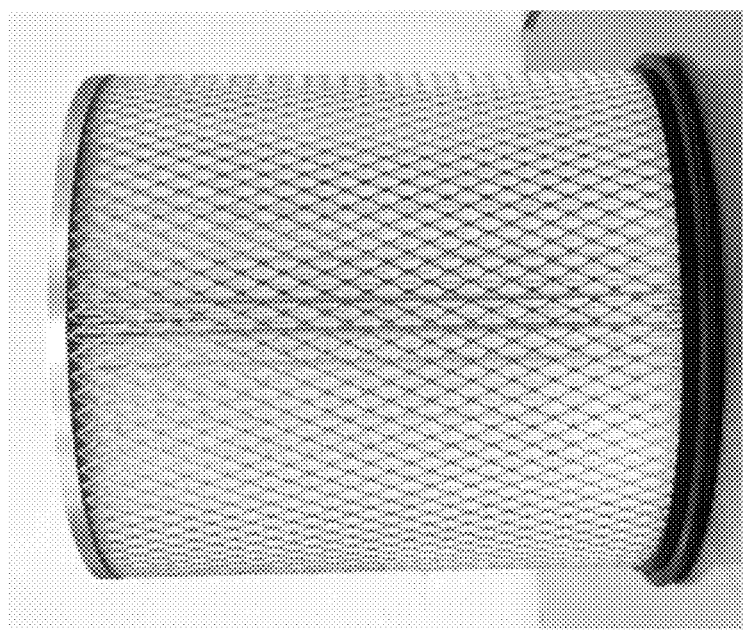
FIG. 10 illustrates a top view of a filter element for the (FTIS) filter assembly of FIG. 9.

FIG. 9 illustrates a cross section of an embodiment of a fuel tank inerting system (FTIS) filter assembly 110. FIG. 10 illustrates a top view of a binderless filtration media 122 for the (FTIS) filter assembly 110. The FTIS filter assembly 110 is configured for use in and/or to withstand relatively high temperatures (e.g., 600° F., etc.).

In this exemplary embodiment, the FTIS filter assembly 110 includes a binderless filtration media 122 (no binder) suitable for use in high temperatures. By eliminating or not using a binder, the FTIS filter assembly 110 thus avoids the use of a binder may dislodge/melt at high temperatures resulting in poor/no filtration and/or that may become another VOC (volatile organic compound) contaminate for a FTIS filter assembly. The FTIS filter assembly 110 includes a catalytic converter 130 configured to adsorb one or more VOCs, such as Toluene, Propylene Glycol ($C_3H_8O_2$), Pentanoic Acid, Butane ($C_4H_{10}$), Formaldehyde ($CH_2O$), and Carbon Dioxide ($CO_2$). In exemplary embodiments, the FTIS filter assembly 110 includes a catalytic converter 130 that is custom designed to adsorb one or more customer defined VOCs.

With continued reference to FIG. 9, arrows 116 signify a path for the flow of air from the inlet 112 to the outlet 114. In operation, the air first flows into the manifold 118 where it is directed into the filter bowl 120 (e.g., a machined bowl, etc.). Within the filter bowl 120 is a filter element or binderless filtration media 122 (no binder) suitable for use in high temperatures (e.g., 600° F., etc.). An annular space 124 is defined by an interior surface of the filter bowl 120 and an exterior surface of the binderless filtration media 122. The air flows from the manifold 118 and into the annular space 124, enveloping the binderless filtration media 122.

From the annular space 124, the air flows through the binderless filtration media 122, where stage 1 and stage 2 of the filtration process removes liquids, particulates, and aerosols. From the filter element 212, the air passes through a catalytic converter 130 (e.g., cleanable ozone converter, etc.) and back into the manifold 118, where the air is directed out through the outlet 114.

Similar to the manifold 18 shown in FIG. 3, the manifold 118 of the FTIS filter assembly 110 (FIG. 9) may also include protrusions at a base end having through holes for mounting the manifold 118. The manifold 118 may be circular in shape and have a centrally located ring configured to receive the catalytic converter 130 and the binderless filtration media 122. The centrally located ring of the manifold 118 may have an inner flange configured to receive a base of the catalytic converter 30, and an outer flange configured to receive a base of the filtering element 122.

Similar to the filter element 22 shown in FIGS. 4 and 5, the binderless filtration media 122 (FIG. 10) of the FTIS filter assembly 110 (FIG. 9) may comprise a porous, multilayer sheet of material that is folded into pleats and formed in a cylinder. The top of the cylinder may be sized to fit in a protrusion of the filter bowl 120, while the base may be sized to engage an outer flange of the manifold 118. Thus, when assembled, the binderless filtration media 122 may be held in place at the top end by the protrusion and at the bottom end by the outer flange. Air is only able to pass from the annular space 124 into the outlet 114 of the manifold 118 by passing through the binderless filtration media 122.

In some embodiments, the base of the binderless filtration media 122 and/or the top of the binderless filtration media 122 may be formed of an elastic material suitable for forming a seal between the outer flange and the protrusion of the filter bowl 120. In some embodiments, a gasket may be used between sealing surfaces of the filter bowl 120 and the binderless filtration media 122 and/or the manifold 118 and the binderless filtration media 122.

The binderless filtration media 122 may include pleats and multiple layers and stages of filtration. The binderless filtration media 122 may use conventional filtration techniques to filter particulates in the air passing through the binderless filtration media 122 including impingement, interception, diffusion, and straining. The binderless filtration media 122 may be comprised of fiber having a size and spacing selected for the desired level of filtering.

In addition to the conventional filtering of particulates and aerosols, the filter element 122 may include layers that are hydrophobic, either by way of a coating or the fibers themselves being hydrophobic. The binderless filtration media 122 may filter water droplets in the air passing through the filter in a conventional manner like it does for particulates and aerosols. However, because the fibers are hydrophobic, the water droplets captured on the fibers are unable to wet the surface. The water droplets then combine to form water droplets of increasing size, eventually dropping from the binderless filtration media 122 and into the manifold 118.

The catalytic converter 130 may have passageways passing through the catalytic converter 130 from an outer surface to a converter outlet, such that air flows through the catalytic converter 130 to reach the converter outlet. The passageways may be formed by an open cell structure, a porous structure of the cleanable ozone converter, rows of material having gaps there between, pellets having interstitial spaces between adjacent pellets, or other techniques as known to one of skill in the art. The passageways increase the surface area of the catalytic converter 130 that interact with the air flowing through the catalytic converter 130.

The catalytic converter 130 contains a catalyst material such as platinum, platinum alloy, or other catalyst materials as known in the art. The catalyst material increases the rate at which ozone contained in the air flow decomposes and reacts with atmospheric oxygen. The passageways in the catalytic converter 130 may be coated with the catalyst material rather than having a solid catalyst construction. For example, in one embodiment a corrosion resistant foil substrate coated with a slurry of platinum and iridium is used to form a honeycomb of passageways through the catalytic converter 130. Such materials are compatible to most known contaminants in a climate controlled operating environment.

The manifold 118 may be generally mounted to a secure surface using protrusions at the base of the manifold 118. The filter bowl 120 may be removable to allow access to the interior of the FTIS filter assembly 110. A V-band or ring clamp 160 may be used to secure the filter bowl 120 to the manifold 118 in a removable fashion. A removable insulation layer 162 (e.g., insulation blanket, etc.) may be placed over the filter bowl 120 for insulation. The insulation layer 162 may have hook and loop fasteners for temporary attachment to the manifold 118 or bowl 120, allowing the insulation layer 162 to be easily removed for service. Other fasteners are possible such as snaps, button, zippers, and other means of temporary attachment.

The catalytic ozone converter 130 may be housed on an inner flange of the manifold 118 with the binderless filtration media 122 surrounding the catalytic ozone converter 130; the binderless filtration media 122 being housed on the outer flange. Gaskets may be placed between the filter bowl 120 and the manifold 118, the catalytic ozone converter 130 and the manifold 118, the filter bowl 120 and the binderless filtration media 122, and the manifold 118 and the binderless filtration media 122.

In use, liquid captured by the binderless filtration media 122 falls into the manifold 118 when the droplets grow to suitable size. First and second drain plugs or valves 170 and 174 in the bottom of the manifold 118 allow the liquid to drain out the bottom of the manifold 118. As shown in FIG. 9, the first drain plug 170 is upstream of the binderless filtration media 122, and the second drain plug 174 is downstream of the catalytic ozone converter 130. The first and second drain plugs 170, 174 may be pressure sensitive, such that they only drain when a set inlet pressure is exceeded. For example, the first and second drain plugs 170, 74 might be closed when the FTIS filter assembly 110 is not in use, but when air is directed to the inlet 112, the increase in pressure may cause the first and/or second drain plugs 170, 174 to open, draining any liquid in the manifold 118.

The described filtrations system allows for a compact, lightweight design for the filtration of air and removal of ozone. In some embodiments, the design allows a complete filter assembly to be less than fourteen inches in height and less than one foot in diameter, while weighing less than twenty pounds. Additionally, the filtration system may have a flow rate of between ten pounds per minute and thirty-two pounds per minute at one hundred fifty pounds per square inch of pressure.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. For example, when permissive phrases, such as "may comprise", "may include", and the like, are used herein, at least one embodiment comprises or includes the feature(s). As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected, or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An air filter assembly comprising:
a housing comprising a manifold having an inlet and an outlet, and a filter bowl removably coupled to the manifold;
a binderless filtration media disposed in the housing, wherein the binderless filtration media is free of binder materials that may degrade or release volatile organic compounds under high-temperature conditions; and
a catalytic converter disposed in the housing;
wherein a flow path is defined through the housing that includes flowing through the binderless filtration media and then through the catalytic converter before exiting the housing.

2. The air filter assembly claim 1, wherein the air filter assembly is a fuel tank inerting system (FTIS) filter assembly configured for use in an FTIS of an aircraft.

3. The air filter assembly claim 1, wherein:
the binderless filtration media is configured for use in and to withstand high temperatures without degradation or VOC release; and
the catalytic converter is configured to adsorb one or more volatile organic compounds.

4. The air filter assembly of claim 1, wherein:
the air filter assembly is configured for use in a fuel tank inerting system (FTIS) of an aircraft;
the binderless filtration media is configured for use in and to withstand high temperatures of at least about 600 degrees Fahrenheit without degradation or VOC release;
the catalytic converter is configured to adsorb one or more volatile organic compounds; and
the air filter assembly integrates multiple functions including particulate, aerosol, liquid, ozone, and VOC removal in a compact form factor optimized and/or usable for a fuel tank inerting system (FTIS) of an aircraft.

5. The air filter assembly of claim 1, wherein the catalytic converter is configured to adsorb one or more of Toluene, Propylene Glycol ($C_3H_8O_2$), Pentanoic Acid, Butane ($C_4H_{10}$), Formaldehyde ($CH_2O$), and Carbon Dioxide ($CO_2$).

6. The air filter assembly of claim 1, wherein the air filter assembly includes a particulate/coalescing element disposed in the housing, the particulate/coalescing element including the binderless filtration media.

7. The air filter assembly of claim 6, further comprising an annular space which is defined by an interior surface of the filter bowl and an exterior surface of the particulate/coalescing element.

8. The air filter assembly of claim 6, wherein the housing, the particulate/coalescing element, and the catalytic converter are electrically bonded.

9. The air filter assembly of claim 6, wherein the manifold is circular in shape and has a centrally located ring configured to receive the catalytic converter and the particulate/coalescing element.

10. The air filter assembly of claim 6, wherein the catalytic converter is an extruded ozone converter that is electrically bonded to the housing and the particulate/coalescing element.

11. The air filter assembly of claim 1, wherein the catalytic converter includes an ozone converter including a passageway having a catalytic interface surface.

12. The air filter assembly of claim 1, wherein the catalytic converter comprises an ozone converter made from an extrusion process.

13. The air filter assembly of claim 1, wherein the catalytic converter comprises a cleanable ozone converter configured to be reused after cleaning and that comprises a honeycomb structure coated with a catalyst material.

14. The air filter assembly of claim 1, wherein the catalytic converter comprises an extruded ozone converter.

15. The air filter assembly of claim 1, wherein the catalytic converter comprises a honeycomb of passageways.

16. The air filter assembly of claim 1, further comprising first and second drain plugs in a bottom of the manifold, wherein the first drain plug is upstream of the binderless filtration media, and the second drain plug is downstream of the catalytic converter, each of the first and second drain plugs is configured to drain accumulated liquid based on pressure thresholds.

17. The air filter assembly of claim 1, wherein the manifold comprises protrusions at a base end having holes for mounting the manifold.

18. A method of filtering air comprising:
   supplying air into an inlet of an air filter assembly, the air filter assembly comprising:
      a housing comprising a manifold having the inlet and an outlet, and a filter bowl removably coupled to the manifold;
      a binderless filtration media disposed in the housing, wherein the binderless filtration media is free of binder materials that may degrade or release volatile organic compounds under high-temperature conditions; and
      a catalytic converter disposed in the housing;
      wherein a flow path is defined through the housing that includes flowing through the binderless filtration media and then through the catalytic converter before exiting the housing; and
   directing the air into the filter bowl; and
   passing the air through the binderless filtration media; and
   passing the air through the catalytic converter after the air passes through the binderless filtration media.

19. The method of claim 18, wherein:
   the air filter assembly is a fuel tank inerting system (FTIS) filter assembly configured for use in an FTIS of an aircraft;
   the binderless filtration media is configured for use in and to withstand high temperatures of at least about 600 degrees Fahrenheit without degradation or VOC release;
   the catalytic converter is configured to adsorb one or more volatile organic compounds; and
   the air filter assembly integrates multiple functions including particulate, aerosol, liquid, ozone, and VOC removal in a compact form factor optimized and/or usable for a fuel tank inerting system (FTIS) of an aircraft.

20. An air filter assembly configured for use in a fuel tank inerting system (FTIS) of an aircraft, the air filter assembly comprising:
   a housing comprising a manifold having an inlet and an outlet, and a filter bowl removably coupled to the manifold;
   a binderless filtration media disposed in the housing, wherein the binderless filtration media is free of binder materials that may degrade or release volatile organic compounds under high-temperature conditions;
   a catalytic converter disposed in the housing and comprising a honeycomb of passageways, the catalytic converter configured to adsorb one or more volatile organic compounds including one or more of one or more of Toluene, Propylene Glycol ($C_3H_8O_2$), Pentanoic Acid, Butane ($C_4H_{10}$), Formaldehyde ($CH_2O$), and Carbon Dioxide ($CO_2$); and
   first and second drain plugs in a bottom of the manifold, the first drain plug upstream of the binderless filtration media, the second drain plug downstream of the catalytic converter, the first and second drain plugs configured to drain accumulated liquid based on pressure thresholds;
   wherein:
      a flow path is defined through the housing that includes flowing through the binderless filtration media and then through the catalytic converter before exiting the housing; and
      the binderless filtration media is configured to withstand high temperatures of at least about 600 degrees Fahrenheit without degradation or VOC release;
   whereby the air filter assembly integrates multiple functions including particulate, aerosol, liquid, ozone, and VOC removal in a compact form factor optimized and/or usable for a fuel tank inerting system (FTIS) of an aircraft.

* * * * *